Patented Jan. 26, 1937

2,069,175

UNITED STATES PATENT OFFICE 2,069,175

SALICYLIC ESTERS OF ACYL GLYCOLS AND PROCESS FOR THE MANUFACTURE OF SAME

Ernst Preiswerk, Munchenstein, near Basel, Switzerland, assignor to Hoffmann-La Roche Inc., Nutley, N. J., a corporation of New Jersey No Drawing. Application April 18, 1936, Serial No. 75,223. In Germany May 24, 1935

4 Claims. (Cl. 260—104)

It has been found that therapeutically valuable esters of salicylic acid may be obtained by heating alkali metal salts of salicylic acid with $\beta$-chloro-ethyl-esters of aliphatic acids. The transformation is particularly successful if an excess of the chloro-ester is used; in this case the unreacted chloro-fatty-acid-ester may be easily and completely recovered.

The new salicylic acid esters are compounds possessing a high boiling point, a low melting point and a very slight odor. They are particularly well suited for percutaneous application in the treatment of rheumatism because, owing to their ready solubility in oils, they are easily miscible with fatty ointments. When a suitable ointment of these esters admixed with histamine is rubbed into the skin, the salicylic esters of acyl-glycols have the property of facilitating the absorption of the histamine through the skin. In this manner the required quantity of the expensive histamine can be reduced without lessening the therapeutic effect.

The salicylic esters of acyl glycols are to be used in medicine.

Example 1

50 parts by weight of dry sodium salicylate are heated with 75 parts by weight of formic-acid-$\beta$-chloro-ethyl-ester (obtained by warming highly concentrated formic acid with ethylene-chlorhydrin in the presence of anhydrous calcium chloride) in an oil-bath at 155–165° C. under a reflux condenser for 24 hours while stirring. The reaction product is then left to cool and poured with stirring into 75 parts by weight of cold water. About 6 parts by weight of 10% sodium carbonate solution are allowed to flow into the continuously agitated solution, until the aqueous phase reacts distinctly alkaline to litmus paper. The oil is then removed, again washed with water and distilled in vacuo, whereby water and formic-acid-chloro-ethyl-ester come over up to 100° C. On further heating the salicylic ester of formyl glycol distils under a pressure of 11 mm. at 163–165° C. 55–56 parts by weight are obtained. By repeated distillation under reduced pressure the ester is obtained in quite pure form. On being left to stand for some time in the cold it sets to colorless crystals melting at 26° C.

Example 2

160 parts by weight of sodium salicylate are heated with 235 parts by weight of acetic-acid-chloro-ethyl-ester for 10 hours to 160° C. while stirring. The cooled reaction product is washed with water and dilute sodium carbonate solution and distilled in vacuo. The first fraction consists of the chloro-ester used in excess. The salicylic ester of acetyl glycol boils under 12 mm. pressure between 170–171° C. It is a colorless and almost odorless oil. The yield is about 95%.

Example 3

100 parts by weight of sodium salicylate are heated with 120 parts by weight of isovaleric-acid-$\beta$-chloro-ethyl-ester (obtained from isovaleryl chloride and ethylene-chlorhydrin) for 28 hours to 160° C. while stirring. The reaction product is then treated in the manner described in Example 1.

The salicylic ester of isovaleryl glycol is a colorless, rather viscous oil boiling at 201° C. under 12 mm. pressure.

I claim:

1. The salicylic esters of the lower aliphatic mono-carboxylic acid esters of glycols, such substances being particularly well suited for percutaneous application.

2. The salicylic ester of acetyl glycol, a colorless and almost odorless oil boiling under 12 mm. pressure between 170–171° C. and being particularly well suited for percutaneous application.

3. The process for the manufacture of salicylic esters of the lower aliphatic mono-carboxylic acid esters of glycols which consists in heating the alkali metal salts of salicylic acid with $\beta$-chloro-ethyl-ester of aliphatic acids.

4. The process for the manufacture of the salicylic ester of acetyl glycol which consists in heating sodium salicylate with acetic-acid-chloro-ethyl-ester.

ERNST PREISWERK.